United States Patent [19]
Cantwell

[11] 4,437,303
[45] Mar. 20, 1984

[54] FUEL CONTROL SYSTEM FOR A GAS TURBINE ENGINE

[75] Inventor: Hugh F. Cantwell, Littleover, England

[73] Assignee: Rolls-Royce Limited, London, England

[21] Appl. No.: 320,126

[22] Filed: Nov. 10, 1981

[30] Foreign Application Priority Data

Nov. 26, 1980 [GB] United Kingdom ................. 8037966

[51] Int. Cl.³ .............................................. F02C 9/28
[52] U.S. Cl. .................................... 60/39.281; 60/243
[58] Field of Search ............................ 60/39.281, 243

[56] References Cited

U.S. PATENT DOCUMENTS 3,648,033  3/1972  Bader ............................... 60/39.281
3,854,287  12/1974  Rembold ......................... 60/39.281
3,969,890  7/1976  Nelson ............................. 60/39.281

*Primary Examiner*—Louis J. Casaregola
*Attorney, Agent, or Firm*—Cushman, Darby & Cushman

[57] ABSTRACT

A fuel control system for a gas turbine engine comprises a main steady-state fuel control unit which adjusts the fuel flow to the engine to produce an approximation to a desired thrust and a trimmer device which trims the fuel flow demanded by the main unit to produce a closer approximation to the desired thrust. During transients such as accelerations a trimmer suitable for steady operation will apply zero trim until the desired thrust is almost attained, when an amount of trim may have to be applied rapidly. This can lead to overshoots.

To mitigate the problem the trimmer is provided with a model of the main control unit which derives an approximation to the trim which will be required when the steady state is reached. This is applied to the main unit throughout the transients, and when the desired thrust is achieved only second-order changes need to be made.

5 Claims, 1 Drawing Figure

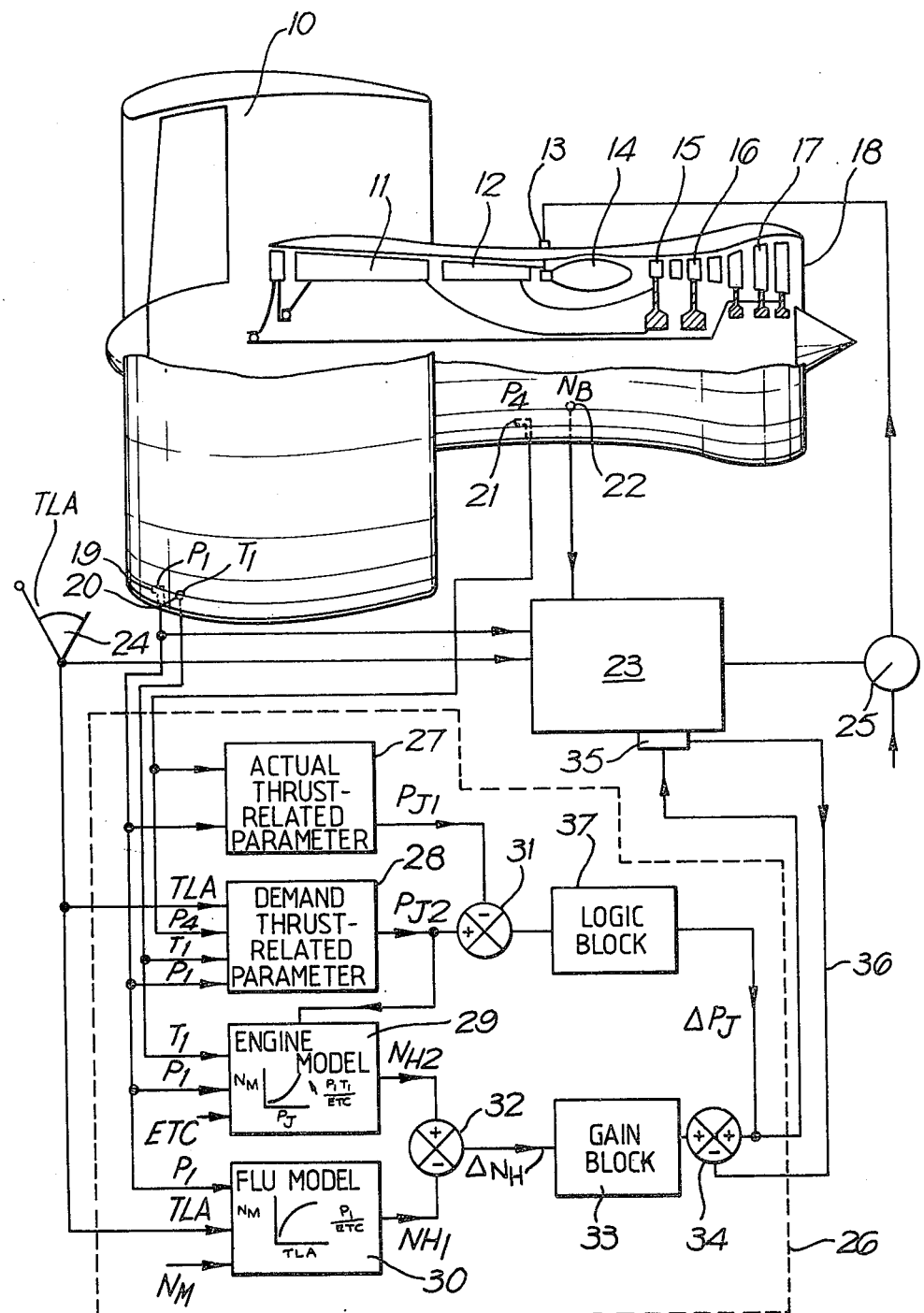

FUEL CONTROL SYSTEM FOR A GAS TURBINE ENGINE

This invention relates to a fuel control system for a gas turbine engine.

In the past the control of the fuel flow to the gas turbine engine has been carried out in the majority of cases using a hydro-mechanical device which includes elements which deal with steady state situation such as cruise and take-off settings and with transient conditions such as accelerations between the various steady states. The hydro-mechanical system has been found to be very reliable both in the short and long term but because only a certain degree of complication can be tolerated it cannot control the fuel in accordance with more than 2 or 3 engine parameters.

On the other hand electronic fuel control systems can easily adapt to a high degree of complication and can therefore use numerous inputs relating to engine parameters to provide a very accurate control fuel flow. Unfortunately, electronic fuel control systems have not as yet demonstrated the very high degree of reliability that can be achieved by hydro-mechanical systems.

One way of combining the best features of these two alternative systems is to control the fuel flow using a hydro-mechanical governor which produces a resonable approximation to the correct flow and to reduce or trim this flow in accordance with a more complex electronic trim device which may take into account many more parameters than the hydro-mechanical device. In this way by arranging that the trim device can only affect a proportion of the fuel flow any complete failure of the electronic trim device would not cripple the engine concerned but would allow it to be safely used, albeit in not such an efficient manner, until repair can be effected.

Conventional devices of this kind operate quite satisfactorily in the steady state conditions referred to above but there can be problems at the transition from a transient to a steady state condition. Thus considering the case of a slam acceleration to maximum thrust, during acceleration the engine parameters in general have values lower than those demanded for the maximum thrust condition and therefore the negative trim device will not be operational. When the steady state condition is reached the trim device will therefore need to change very quickly from applying zero trim to applying what might be a large value of trim. Usually this cannot be effected in time and over-shoots may result.

The present invention provides a fuel control unit in which the trimmer device is provided with the capability of predicting an eventual steady state trim so that the amount of change of trim necessary at these transition conditions is reduced.

According to the present invention a fuel control system for a gas turbine engine comprises transducers for producing signals related to parameters of the engine including at least one thrust related parameter, a throttle lever on which a desired engine thrust may be set, a main steady state fuel control unit which determines the value of a first said thrust-related parameter corresponding with the setting of the throttle lever and controls the fuel flow to the engine to maintain the actual value of the first thrust-related parameter determined from a transducer signal at least approximately equal to the value determined by the fuel control unit, and a trimmer device which provides a more accurate control of engine thrust by trimming the fuel flow demanded by the main fuel control unit, the trimmer incorporating a model of said main fuel control unit in which the predicted value of said first thrust-related parameter determined by said main fuel control unit in accordance with the setting of the throttle lever is calculated and used to produce a first trim setting during non-steady state operation of the engine.

Said trimmer may have two modes of operation, in one of which its output comprises said first trim setting, and in the other of which its output includes a second trim setting determined in accordance with the error between an actual value of a second thrust-related parameter of the engine and a desired value calculated from the throttle lever angle and other engine parameters.

Said trimmer may also include an engine model in which the value of said first thrust-related parameter corresponding with the engine parameters and throttle lever angle is calculated, from which value said value of the first thrust-related parameter calculated to be determined by the main fuel control unit is subtracted to produce said first trim setting.

The main fuel control unit preferably operates as a closed loop system in which the actual value of the first thrust-related parameter is compared with the demanded value. Similarly the trimmer may operate in a closed loop fashion by comparing the actual trim with the demanded trim.

Said first thrust-related parameter may be the same parameter as said second thrust-related paremeter, or it may differ from it. Thus, the rotational speed of the high pressure spool of the engine or the pressure ratio across the engine or an area weighted average jet pipe pressure may be used as the thrust-related parameter in either or both of the main fuel control unit and the trimmer.

The invention will now be particularly described merely by way of example with reference to the accompanying drawing which is:

A diagrammatic representation of a gas turbine engine and a fuel control system in accordance with the invention.

In the drawing there is shown a gas turbine engine 10 which in the present instance comprises a three-shaft front fan engine. Operation of the engine overall is conventional in that air is taken into the engine intake, compressed in the fan 10 and divided between a fan stream which produces propulsive thrust and a core engine stream which passes into the intermediate pressure compressor 11. The air is compressed in the intermediate and high pressure compressors 11 and 12 and fuel is injected into the air by a fuel injection system 13. Burning takes place in the combustion chamber 14 and the resulting hot gases pass in sequence through high pressure intermediate pressure and low pressure turbines 15, 16 and 17 respectively. The hot gases then flow to atmosphere through a nozzle 18 to produce additional propulsive thrust. Drive shafts interconnect the various turbines with their respective compressors so that the turbines drive the compressors.

In order to control the fuel flow to the injection system 13 various parameters of the engine must be measured. In the engine illustrated transducers 19, 20, 21 and 22 are used to produce signals proportional to the intake pressure $P_1$, the intake temperature $T_1$, the high pressure compressor delivery pressure $P_4$ and the rotational speed of the high pressure system $N_h$ respectively.

It may of course be desirable to provide additional transducers which measure other engine parameters such as the Mach No. of the external airflow, the amount of bleed being taken from the engine etc.

In the present instance outputs from the transducers 19 and 22 are fed into the main fuel control unit 23 together with a signal from the pilots throttle lever 24. The fuel control system is arranged to allow the pilot to select a desired thrust from the lever 24 which the fuel control system will then cause to be produced by the engine.

The main fuel control unit 23 can be notionally divided into two components, one of which deals with steady state conditions of the engine such as take-off idle and cruise power settings while the second part, the acceleration control unit, deals with transients inbetween these steady state conditions. In the present case both these functions are dealt with by hydro-mechanical systems. Detailed operation of the unit 23 is not described herein but it will be appreicated that there are conventional systems which may be used such for instance as that illustrated in U.S. Pat. No. 3,420,056. However, the overall effect of the unit 23 is to actuate a valve 25 which sets fuel flow to the burners 13 at such a value as will at least approximately provide values of $N_h$ which will provide the thrust determined by the throttle lever 24, under the prevailing conditions indicated by the value of $P_1$.

Because of its relatively simple nature and because it only takes account of the single thrust related parameter $N_h$ the unit 23 does not always provide the exact thrust required. Therefore a trimmer device generally indicated at 26 is provided. The trimmer device 26 has four main units 27, 28, 29 and 30. The unit 27 has inputs relating to the actual condition of the engine, illustrated in this instance as being $P_4$ and $P_1$. These inputs are taken from the transducers 19 and 21. Within the unit 27 the actual value of a thrust related parameter is calculated. In this embodiment the thrust-related parameter is shown as $P_j$ which is the value of some additional pressure of the engine and is chosen to be uniquely related to the thrust of the engine. The output of the unit 27, $P_{j1}$ is therefore an indication of precise actual thrust of the engine. In the second unit 28 a second value of $P_j$ is calculated but in this case it is a value which would obtain if the engine thrust were exactly that demanded by the setting of a throttle lever 24. The unit 28 must clearly have inputs of throttle lever angle, $P_4$ and $P_1$ but it may also be provided with various other inputs such as $T_1$, Mach No. bleed etc. Obviously the more information which can be used by unit 28 to calculate the demanded value of $P_j$ the more accurate this value will be. The output of the unit 28, $P_{j2}$ is therefore closely related to the desired thrust of the engine.

If the engine thrust actually being produced is exactly that demanded $P_{j1}$ will equal $P_{j2}$, but under normal conditions where the unit 23 is not giving precisely the correct fuel flow there will be a difference.

The signals $P_{j1}$ and $P_{j2}$ are subtracted from one another in the device 31 to provide a difference signal which contributes to the overall trim signal. Under steady state running conditions this signal (referred to as the second trim setting) would be all that is necessary to trim or reduce the fuel flow set by the unit 23 to provide accurate engine thrust. However, there is a problem in that if the engine is accelerated by setting the throttle lever 24 at a higher value of thrust, the difference between the parameters $P_{j1}$ and $P_{j2}$ wil be such as to demand a positive trim which is not normally allowed. The trim set by the units 27 and 28 will therefore be a zero trim until the demanded thrust is almost achieved. At this point it would be necessary for a degree of trim to be applied and the trimmer device will only be able to apply this trim at a finite speed. Normally this speed will not be sufficient to prevent overshoot of and thrust above the desired value.

Therefore the trimmer device in the present invention is provided with an arrangement which allows it to predict the trim which will be required at the desired steady state condition. This arrangement uses the units 29 and 30. The unit 29 consists of a mathematical model of the performance of the engine using various different values of the parameters of the ambient pressure and temperature and thrust level. Inputs of $P_1$ and $T_1$ are converted by the unit 29 to an output $N_{h2}$ which is a value of the high pressure rotor speed of the engine which is required to meet the thrust level set on the throttle lever 24.

The unit 30 consists of a mathematical model of the response of the main fuel control unit 23 to varying inputs of $N_h$, throttle lever angle and $P_1$. It has these three inputs while its output $N_{h1}$ comprises the value of $N_h$ which the fuel control unit would demand in an attempt to achieve the thrust required by the particular setting of the throttle lever 24.

As described above because of slight discrepancies between the response of the main fuel control system and that of the engine, the value of $N_h$ demanded by the unit 23 would not precisely correspond with that required to produce the exact thrust demanded by the throttle lever 24 and the difference between these will be the amount of trim necessary in the steady state condition. By setting an approximation to this degree of trim during a transient such as an acceleration, the amount of change of trim necessary when the engine reaches the steady state will only be very minor and can therefore be carried out very quickly without the same danger of overshoots.

The two values of $N_h$ produced by units 29 and 30 which are denoted as $N_{h2}$ and $N_{h1}$ respectively are therefore subtracted in the device 32 to produce a trim signal $\Delta N_h$ and this passes through a gain block 33 to a further device 34. The output from this device is referred to as the first trim setting and is fed to a trimming device 35 which forms part of the main fuel control unit 23 and which causes the unit to reduce its demanded value of fuel flow by the amount of trim. A feed back from the device 35 passes along the line 36 to the adding device 34 where it is used as a negative feed back to complete the servo loop.

In addition to the signal $\Delta N_h$ the steady state trimming parameter $\Delta P_j$ is passed into the unit 35 and in order to ensure that the additional trim is in control during transient conditions $\Delta P_j$ passes through a logic block 37 which will only allow $\Delta P_j$ to pass through if it is less than a predetermined value. Therefore during transients when the demanded thrust differs widely from the actual thrust the trim signal will only include $\Delta N_h$. As the end of the transient is reached and the thrust more nearly approaches the demanded value $\Delta P_j$ is added to $\Delta N_h$ to produce the steady state trim signal.

It will be seen that by using the prediction of the operation of the main unit 23 it is possible to preset a degree of trim which approximates to that required in the steady state condition and therefore avoid the necessity for large trim changes at the end of the transient.

Although described above using $N_h$ as the thrust-related parameter within the main unit 23 and $P_j$ as a different thrust related parameter in the steady state trim device it will be understood that various different thrust related parameters could be used. Thus in particular the main fuel control unit could be arranged to operate on the pressure ratio $P_4/P_1$ while various other parameters could be used to produce the steady state trim signals. It should also be noted that the prediction of performance of the unit 23 is the essential feature of the predictive system; it will be possible to arrange for a system to operate without the engine model 29.

I claim:

1. A fuel control system for a gas turbine engine comprising transducers for producing signals related to parameters of the engine, including at least one thrust-related parameter, a throttle lever on which a desired engine thrust may be set, a main steady-state fuel control unit which determines a value of a first said thrust-related parameter corresponding with the setting of the throttle lever and controls the fuel flow to the engine to maintain the actual value of the first thrust-related parameter determined from a transducer signal at least approximately equal to the value determined by the fuel control unit, and a trimmer device which provides a more accurate control of engine thrust by trimming the fuel flow demanded by the main fuel control unit, the trimmer incorporating a model of said main fuel control unit in which the predicted value of said first thrust-related parameter determined by said main fuel control unit in accordance with the setting of the throttle lever is calculated and used to produce a first trim setting during non-steady state operation of the engine.

2. A fuel control system as claimed in claim 1 in which said trimmer device includes means for determining a second trim setting in accordance with the error between an actual value of a second thrust-related parameter of the engine and a desired value calculated from the throttle lever setting and other parameters of the engine.

3. A fuel control system as claimed in claim 2 in which said trimmer device further includes a model of the performance of the engine in which the value of said first thrust-related parameter corresponding with the other engine parameters and throttle lever setting is calculated and from which value said predicted value of the first thrust-related parameter is subtracted to produce said first trim setting.

4. A fuel control system as claimed in claim 1 and including means for operating said main fuel control unit as a closed loop system in which the actual value of the first thrust-related parameter is compared with the demanded value.

5. A fuel control system as claimed in claim 1 and including means for operating said trimmer device in a closed loop fashion by comparing the actual trim with that demanded.

* * * * *